United States Patent [19]

Kitai et al.

[11] 4,231,647
[45] Nov. 4, 1980

[54] AUTOMATIC FOCUSING CAMERA

[75] Inventors: Kiyoshi Kitai; Yuzuru Takazawa, both of Chiba, Japan

[73] Assignee: Seiko Koki Kabushiki Kaisha, Tokyo, Japan

[21] Appl. No.: 8,761

[22] Filed: Feb. 1, 1979

[30] Foreign Application Priority Data

Feb. 7, 1978 [JP] Japan .................................. 53-12702

[51] Int. Cl.³ .............................................. G03B 3/10
[52] U.S. Cl. ...................................... 354/195; 354/25
[58] Field of Search .......................... 354/25, 163–169, 354/195; 352/139, 140; 250/234, 236

[56] References Cited

U.S. PATENT DOCUMENTS

| | | | |
|---|---|---|---|
| 3,274,914 | 9/1966 | Biedermann et al. | 354/25 |
| 3,443,502 | 5/1969 | Harvey | 354/25 |
| 3,618,499 | 11/1971 | Harvey | 354/25 X |
| 4,154,517 | 5/1979 | Tamura et al. | 354/25 |
| 4,183,643 | 1/1980 | Imura et al. | 354/25 |

FOREIGN PATENT DOCUMENTS 951248 3/1964 United Kingdom ...................... 354/195

Primary Examiner—John Gonzales
Assistant Examiner—William B. Perkey
Attorney, Agent, or Firm—Robert E. Burns; Emmanuel J. Lobato; Bruce L. Adams

[57] ABSTRACT

An automatic focusing apparatus for a camera is provided with a movable focusing member which adjusts the focus of the photographic lens of a camera and which has a cam section comprising a set of cam-shaped portions which are disposed thereon to effect the positioning of the focusing member in positions corresponding to predetermined object distances. A first arresting mechanism is mounted for movement between a first range of positions in which it is engageable with any one of the cam-shaped portions and a second range of positions in which it cannot engage the cam-shaped portions. A second arresting mechanism moves in response to the movement of the first arresting mechanism into the second range of positions, from a rest position where it does not engage any cam-shaped portions to an operative position where it engages a predetermined one of the cap-shaped portions corresponding to a cam focus. A focus detecting circuit detects the object focus of an object to be photographed, however is unable to so detect the object focus under certain conditions such as insufficient brightness or contrast. An electromagnetic mechanism is responsive to the detection of the object focused for holding the first resting mechanism in the first range of positions at a position in which it engages the cam-shaped portion corresponding to the detected object focus distance. It is responsive to the inability of the focus detecting circuit to detect the object focus for effecting movement of the first arresting mechanism into the second range of positions and thereby the movement of the second arresting mechanism into the operative position whereby a cam focus of the lens will be obtained. In this way, the object will be capable of being photographed even under the aforementioned adverse conditions.

4 Claims, 3 Drawing Figures

AUTOMATIC FOCUSING CAMERA

BACKGROUND OF THE INVENTION

This invention relates to a camera of the type that is capable of the automatic focusing of a photographic lens.

Although various automatic focusing cameras employing an electromagnet actuated by a signal when the object distance is detected have been introduced, the cameras wherein the photographic lens is adjusted to a focus matching position by detecting the focus matching position by an electric signal produced by a conventional range finder of the movable mirror type have difficulty in detecting the focus matching position when the brightness and the contrast of the object is under a given level. However, in practical photography, the brightness and the contrast of the object could often be under the given level and in this difficult photographing condition, there is the possibility that the photographic lens is adjusted to the position corresponding to the infinite distance range as the nearest range.

SUMMARY OF THE INVENTION

Accordingly, an object of the present invention is to provide a device which is capable of adjusting the photographic lens to what is called the pan-focus position where the photographic lens is focused on a fixed depth of field.

According to the present invention, an automatic focusing camera, capable of automatically bringing into focus the photographic lens by detecting the object distance, is provided with a focusing member for adjusting the photographic lens to a focus matching position having a cam part composed of step cams shaped in proportion to the positions of the photographic lens corresponding to object distances, first arresting means capable of being shifted between a first range where it is engaged with the cam part and a second range where it is disengaged with the cam part, second arresting means for stopping the photographic lens at the pan-focus position when said first arresting means is shifted to the second range, and electromagnetic means connected to a focus detecting circuit which detects the focus matching position of the photographic lens. When the focus detecting circuit detects the focus matching position, the electromagnetic means stops the first arresting means within the first range, and on the other hand, when the focus detection is impossible, the first arresting means is shifted to the second range while the second arresting means adjusts the photographic lens to the pan-focus position.

Furthermore, the second arresting means may be formed of a lever which is actuated by the first arresting means when the first arresting means is shifted to the second range.

Still further, the first and second arresting means may be formed in one body on a single member.

Furthermore, the second arresting means may be adapted so as to be actuated by electromagnetic means which is actuated by the switching motion of the first arresting means in the second range.

DETAILED DESCRIPTION OF THE INVENTION

Explanation will be made hereinafter of preferred embodiments of the present invention with reference to attached drawings.

Figure 1:
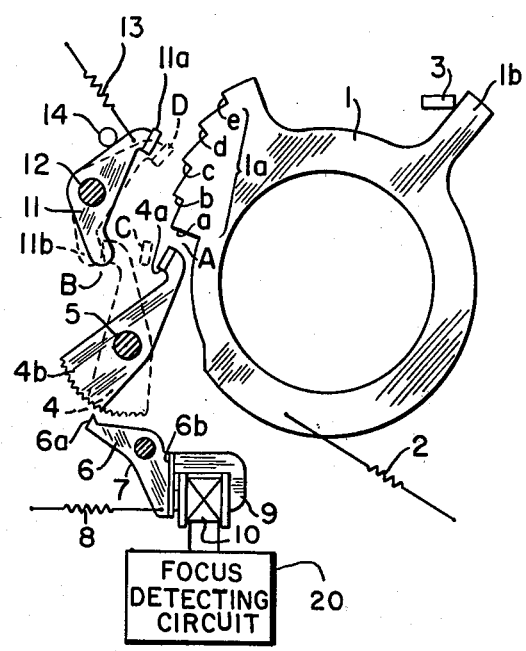
FIGS. 1 to 3, inclusive, are schematic illustrations of preferred embodiments according to the present invention.
Figure 2:
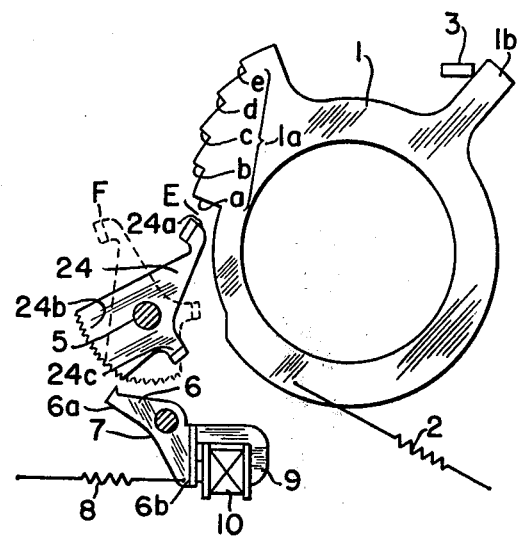
Figure 3:
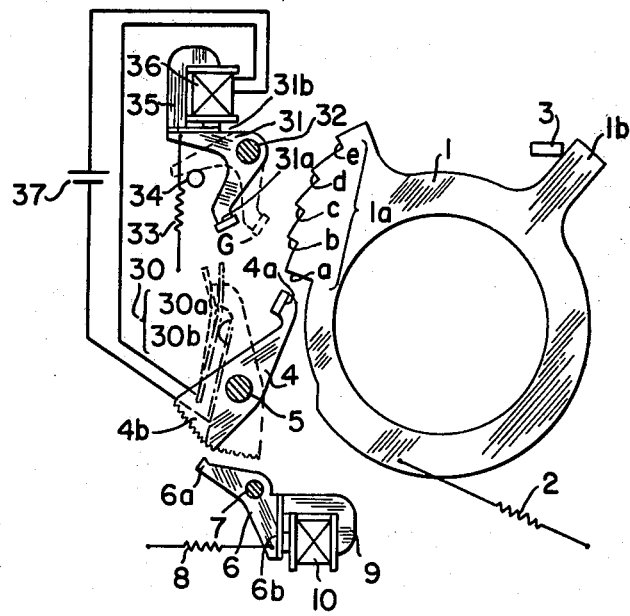

FIGS. 1 to 3, inclusive, are schematic illustrations of preferred embodiments of this invention. In FIG. 1, the second arresting means is provided in the form of a lever. In FIG. 2, the first and the second arresting means are formed in one body on a single member. In FIG. 3, the second arresting means includes a switch and an electromagnet. In the drawings, like members are indicated by like reference numerals throughout.

Referring to FIG. 1, a focusing member (1) having a cam part (1a) composed of step cams a-e shaped in proportion to object distances respectively and a projection (1b), is urged counterclockwise by a spring (2) and functions in adjusting the photographic lens, not shown, to a focus matching position. A pre-travelling member (3) engages with the focusing member (1) at the projection (1b) to set the focusing member (1) to the charged position. First arresting means (4) is turnable about a shaft (5) and is capable of being shifted between a first range where it is able to engage with the cam part (1a) and a second range where it is disengaged from the cam part (1a). The focus of the highest step cam e separates the first and the second range. The first arresting means (4) has an arresting end (4a) which is to be engaged with the cam part (1a) of the focusing member (1) and a ratchet (4b). An armature lever (6) having a detent (6a) which is to be engaged with the ratchet (4b) of the first arresting member (4) and an arm (6b) which is to be attracted by an electromagnet (9) is turnable about a shaft (7) and is urged clockwise by a spring (8). An exciting coil (10) is connected to a focus detecting circuit, 20. The electromagnetic means, comprising the electromagnet (9) and the armature lever (6), is controlled by the focus detecting circuit 20. A second arresting means (11) is rotatable about a shaft (12) and is urged counterclockwise by a spring (13). An arresting end (11a) is provided for the second arresting means (11). When the arresting end (4a) of the first arresting means (4) is shifted into the second range, the arresting end (4a) pushes the second arresting means (11) at the end of an arm (11b) so that the second arresting means is turned clockwise about the shaft (12) and the arresting end (11a) is shifted within the locus of the cam part (1a) so as to be able to engage with one of the step cams of the cam part (1a).

Referring to FIG. 2, an arresting means (24) comprises a first arresting means (24a) and a second arresting means (24c) in one body. Reference numeral (24b) indicates a ratchet. In a modification as shown in FIG. 3, the second arresting means is adapted so as to be actuated by an electrical means including a switch and an electromagnet. Referring to FIG. 3, a normally closed type switch (30) is formed from contact pieces (30a) and (30b). Second arresting means (31) is rotatable about a shaft (32) and is urged counterclockwise by a spring (33). An arresting end (31a) is shifted within the locus of the cam part (1a) of the focusing means (1) and engages with one of the step cams of the cam part (1a) when the second electromagnet (35) is demagnetized. An arm (31b) is attracted by the second electromagnet (35) when the second electromagnet (35) is magnetized. Reference numerals (34), (36) and (37) indicate a limiting pin, an exciting coil for the second electromagnet (35) and a battery, respectively.

Referring particularly to FIG. 1, the manner of operation of the device will be explained. Starting from the charged state as shown in FIG. 1, when the release button, not shown, is depressed, the first arresting means (4) starts turning counterclockwise about the shaft (5) while the movable mirror system, not shown, is actuated by the operation of the release button or the first arresting means (4) starting its scanning operation. Light information of the object obtained by the movable mirror and a stationary mirror, not shown, is input into the focus detecting circuit 20 including a pair of photoelectric elements, and is operated. Provided that the object distance is 1.5 m, for instance, and the step cam (c) of the cam part (1a) of the focusing member (1) corresponds to the object distance of 1.5 m, the focus detecting circuit gives the focus matching signal to cut off the exciting current for the exciting coil (10) so that the electromagnet (9) is demagnetized when the arresting end (4a) of the first arresting means (4) reaches the position (C) on the locus of the step cam (c) of the cam part (1a) within the first range. Consequently, the armature lever (6) which has been attracted by the electromagnet (9) is allowed to be turned clockwise about the shaft (7) by the spring (8) and the detent (6a) of the armature lever (6) engages with the ratchet (4b) of the first arresting means (4) to detain the first arresting means (4) at this position. As the release button is depressed successively, the pre-travelling member (3) which has been detaining the focusing member (1) is retracted leftwards allowing the focusing member (1) to be turned counterclockwise by the spring (2). The focusing member (1) is stopped by the engagement of the arresting end (4a) of the first arresting means (4) with the step cam (c), and thus the photographic lens is focused. Explanation has been made on the manner of operation of the device in the normal case where a focus matching signal is produced by the focus detection circuit. Explanation will be made hereinafter on the manner of operation of the device in the case where the focus matching signal is not produced. Similarly to the former case, the first arresting means (4) is turned counterclockwise starting from the position (A) according to the depression of the release button and the arresting end (4a) of the first arresting means (4) keeps moving within the locus of the cam part (1a), in the first range. When the focus matching signal is not produced due to some unfavourable condition, the electromagnet (9) is kept magnetized and therefore, the first arresting means 4 proceeds turning until finally the arresting end (4a) reaches the position (B) where the arresting end (4a) comes to hit against the arm (11b) of the second arresting means (11) and turns the second arresting means (11) clockwise about the shaft (12) against the spring (13) as unit the arresting end (11a) of the second arresting means (11) comes to the position (D) within the locus of the cam part (1a). Suppose that the position of the focusing member (1) where the step cam (e) of the cam part (1a) of the focusing member (1) engages with the arresting end (11a) which has previously shifted to the position (D) corresponds to the pan-focusing position of the photographic lens, photographing is performed successfully if the focus matching signal is not given. Accordingly, the object of the present invention is attained by shifting the arresting end (4a) of the first arresting means (4) to the position within the locus of the cam part (1a) of the focusing member (1) and detaining the first arresting means (4) at the position where the arresting end (4a) engages with one of the step cams (a) to (e) corresponding to the focus matching position of the focusing member (1) when the focus matching signal is given and when the focus matching signal is not given, by operating the second arresting means (11) by the turning motion of the first arresting means (4) to shift the arresting end (11a) of the second arresting means (11) to the position within the locus of the cam part (1a) where the arresting end (11a) engages with one of the step cams of the cam part (1a) corresponding to the pan-focus position of the focusing member (1).

Explanation will be made hereinafter on the manner of operation of the second embodiment of the invention as partly illustrated in FIG. 2. A first arresting means (24a) and a second arresting means (24c) are formed in one body on an arresting member (24). When the focus matching signal is not given, the arresting means (24) turns counterclockwise about the shaft (5) simultaneously with the release operation. The first arresting means (24a) is shifted from the position (E) locating within the locus of the cam part (1a) towards the position (F) located outside the locus of the cam part (1a) while the second arresting means (24c) is shifted into the locus of the cam part (1a). The arresting member (24) stops turning when the second arresting means (24c) reached the position where the second arresting means (24c) is to be engaged with one of the step cams of the cam part (1a) corresponding to the pan-focus position of the focusing member (1). In FIG. 2, the second arresting means (24c) is turned to be located on the locus of the step cam (a) when the first arresting means reaches the position (F). In this case, it is designed so that the photographic lens is adjusted to the pan-focus position when the step cam (a) of the cam part (1a) is engaged with the second arresting means (24c). The second embodiment as shown in FIG. 2 has the advantage that the number of component parts is reduced.

Explanation will be made on the manner of operation of the third embodiment referring to FIG. 3. When the focus matching signal is not given, the arresting end (4a) of the first arresting means (4) is shifted outside the locus of the cam part (1a) of the focusing member (1) and pushes the contact piece (30a) of the switch (30) located within the second range to open the switch (30) so that the second electromagnet (35) is demagnetized allowing the second arresting means (31), the arm (31b) of which had been attracted by the second electromagnet (35), to be turned counterclockwise about a shaft (32) being pulled by a spring (33). The second arresting means (31) is stopped by a limiting pin (34) when the arresting end (31a) reaches the position (G). In the drawing, the position (G) is illustrated as located on the locus of the step cam (e) of the cam part (1a). In this case, it is designed so that the photographic lens is adjusted to the pan-focus position when the step cam (e) of the cam part (1a) of the focusing member (1) is engaged with the arresting end (31a) of the second arresting means (31). The third embodiment has the advantage that employment of electromagnetic means for controlling the second arresting means facilitates the disposition of the second arresting means (31) relative to the focusing member (1).

Although the invention has been described in its three preferred embodiments wherein the focus detecting circuit is constructed so as to produce a signal only when focus detection is possible and not to produce any signal when focus detection is impossible, in a modified form, the focus detecting circuit may be designed, for instance, so as to produce a focus matching signal when focus detection is possible and to produce a focus non-matching signal when focus detection is impossible without departing from the spirit and the scope of the invention. Although this modified focus detecting circuit is possible to be applied to any abovementioned embodiment, explanation of the manner of operation of the embodiment as provided with this modified focus detecting circuit will be made referring to FIG. 1.

When the modified focus detecting circuit 20 is designed so as to produce a focus non-matching signal, indicating that focus detection is impossible due to a poor condition of brightness of the object, when it is activated during the initial stage of the release operation, the first arresting means (4) is started from a position (B) located within the second range and is shifted towards the first range. In the initial stage, the first arresting means (4) is pushing the second arresting means (11) at the arm (11b) within the second range, therefore, the arresting end (11a) of the second arresting means (11) is located within the locus of the cam part (1a) and if the electromagnet (9) is actuated in this state by the focus non-matching signal, the arresting end (11a) is fixed at the position (D) and engages with a step cam of the cam part (1a) to adjust the focusing member (1) to the position corresponding to the pan-focus position of the photographic lens. When the focusing system includes a reciprocating movable mirror and the focus detecting circuit is designed so as to produce a focus matching signal by comparing the input obtained during return stroke of the movable mirror with the input memorized during outgoing stroke of the movable mirror or to produce a focus non-matching signal at the turning point of reciprocation of the movable mirror, the object of the present invention is attained by arranging the mechanism so as to shift the arresting end (4a) from position (A) to position (B) in accordance with the outgoing stroke of the movable mirror, and then to shift the arresting end (4a) from position (B) towards position (A) in accordance with the return stroke of the movable mirror while designing the focus detecting circuit 20 so as to produce a focus non-matching signal at a time corresponding to around the turning point of reciprocation of the movable mirror.

It will be well understood from what has been described that this invention is practicable regardless of the system of the focus detecting circuit. In the preferred embodiments, the electromagnet is magnetized in the initial state and demagnetized at a signal, however, the reverse is also easily practiced. Furthermore, other electromagnetic means, such as a solenoid, may be used instead of the electromagnet. If range indication is desired, the first arresting means (4) or the focusing member (1) is possible to be applied.

As described hereinbefore, according to the present invention, the first arresting means accurately controls the focusing member so as to adjust the photographic lens to a focus matching position when a focus matching signal is produced while if a focus matching signal could not be produced or a focus non-matching signal is given, the first arresting means actuates the second arresting means so that the second arresting means controls the focusing member so as to adjust the photographic lens to a pan-focus position. Accordingly, this invention is capable of eliminating the defect of the conventional automatic focusing camera that the focusing system performs faulty operation when focus detection is impossible.

We claim:

1. An automatic focusing apparatus for a camera comprising: a movable focusing member for adjusting the focus of a photographic lens of a camera, the focusing member having a cam section comprising a set of cam-shaped portions which are disposed thereon to effect the positioning of the focusing member in positions corresponding to predetermined object distances; first arresting means mounted for movement between a first range of positions in which it is engageable with any one of the cam-shaped portions of the cam section and a second range of positions in which it cannot engage with any cam-shaped portion; second arresting means mounted for movement in response to the movement of the first arresting means into the second range of positions from a rest position wherein it cannot engage with any cam-shaped portions to an operative position wherein it engages a predetermined one of the cam-shaped portions corresponding to a pan-focus; a focus detecting circuit for detecting the object focus distance of an object to be photographed; and electromagnetic means responsive to the detection of the object focus distance for holding the first arresting means in the first range of positions at a position in which it engages the cam-shaped portion corresponding to the detected object focus distance and responsive to the inability of the focus detecting circuit to detect the object focus distance for effecting both the movement of the first arresting means into the second range of positions and the movement of the second arresting means into the operative position to engage the predetermined cam-shaped portion whereby a pan-focus of the lens will be obtained.

2. An automatic focusing camera as set forth in claim 1; wherein said second arresting means comprises a lever actuated by said first arresting means when said first arresting means moves into said second range.

3. An automatic focusing camera as set forth in claim 1; wherein said first and second arresting means are formed integrally on a single member.

4. An automatic focusing camera as set forth in claim 1; wherein the electromagnetic means comprises a first electromagnet for holding the first arresting means and a second electromagnet for enabling the engagement of the second arresting means with the focusing member and wherein the second electromagnet is actuated by the movement of the first arresting means into the second range.

* * * * *